(12) United States Patent
Naka

(10) Patent No.: US 7,854,139 B2
(45) Date of Patent: Dec. 21, 2010

(54) VEHICULAR AIR CONDITIONING CONTROL OPERATING APPARATUS

(75) Inventor: Atsushi Naka, Hiroshima (JP)

(73) Assignee: U-Shin Ltd., Tokyo (JP)

(*) Notice: Subject to any disclaimer, the term of this patent is extended or adjusted under 35 U.S.C. 154(b) by 392 days.

(21) Appl. No.: 12/219,059

(22) Filed: Jul. 15, 2008

(65) Prior Publication Data

US 2009/0025507 A1 Jan. 29, 2009

(30) Foreign Application Priority Data

Jul. 27, 2007 (JP) .............................. 2007-195854

(51) Int. Cl.
*B60H 1/32* (2006.01)
*G06F 7/00* (2006.01)
*B60H 1/00* (2006.01)
*F16H 21/12* (2006.01)

(52) U.S. Cl. ............................. 62/244; 62/239; 701/36; 237/5; 237/12.3 R; 74/63

(58) Field of Classification Search ............ 62/125, 62/210, 239, 244; 74/63, 68, 640; 701/1, 701/36; 237/5, 12.4, 12.6, 12.3 R
See application file for complete search history.

(56) References Cited

U.S. PATENT DOCUMENTS 6,405,933 B1* 6/2002 Lacroix ................. 237/12.3 R

FOREIGN PATENT DOCUMENTS

JP 2004-210019 7/2004

* cited by examiner

*Primary Examiner*—Chen-Wen Jiang
(74) *Attorney, Agent, or Firm*—Wenderoth, Lind & Ponack, L.L.P.

(57) ABSTRACT

The invention can securely carry out an operation by a reduced number of the parts. The invention is provided with a base member having a gear lever arranged portion and a pinion member arranged portion, and provided with a communication hole communicating with the gear lever arranged portion in a closed wall portion of the pinion member arranged portion, a gear lever rotatably arranged in a bearing portion, having a gear portion and driving an output member (a control wire) based on a rotation, a pinion member rotatably arranged in the pinion member arranged portion and having a pinion portion engaging with the gear portion via the communication hole, a holder having a retention portion retaining the pinion member in one end, and having a fixing portion fixing to the base member in the other end, and an operation knob arranged so as to be outside fitted to the pinion member and integrally rotating the pinion member.

7 Claims, 4 Drawing Sheets

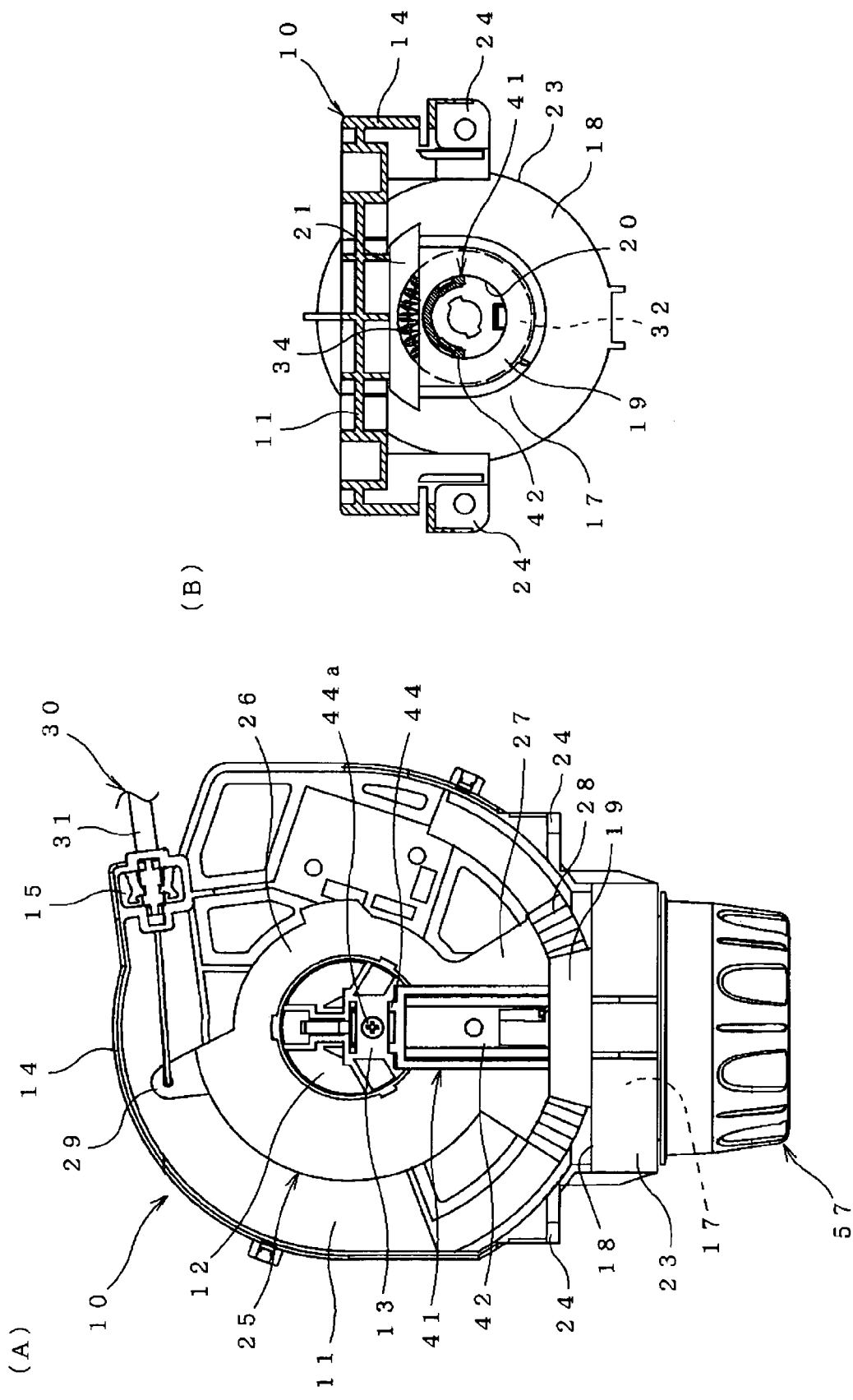

VEHICULAR AIR CONDITIONING CONTROL OPERATING APPARATUS

BACKGROUND OF THE INVENTION

1. Field of the Invention

The present invention relates to a vehicular air conditioning control operating apparatus equipped in an air conditioning apparatus mounted to a vehicle.

2. Description of the Related Art

An air conditioning apparatus for regulating a cool air or a warm air generated by a cooling cycle and a warming cycle so as to reach a desired temperature of an occupant and feeding the air into a vehicle room is mounted to a vehicle. The air conditioning apparatus is structured such as to turn on and off an operation, switch a cooling operation and a warming operation, select a cooling temperature or a warming temperature and select an air supply opening to the vehicle room by operating a vehicular air conditioning control operating apparatus arranged within the vehicle.

As a conventional art document information which is relevant to such a vehicular air conditioning control operating apparatus, there is a Japanese Unexamined Patent Publication No. 2004-210019.

The vehicular air conditioning control operating apparatus of Japanese Unexamined Patent Publication No. 2004-210019 is structured such as to control an air conditioning of the vehicle by operating a ring-shaped dial knob rotating around a display portion on which an operating position or the like is displayed. The apparatus is structured such as to control the air conditioning (select an air supply opening) by rotating a gear lever based on an operation of the dial knob and driving a control wire based on the rotation. Further, in the same manner, the apparatus is structured such as to regulate an angle of a mix damper mixing a cool air or a warm air generated from a cooling cycle or a warming cycle with an outside air at a predetermined rate, and regulate an air supply temperature into the room.

However, in this vehicular air conditioning control operating apparatus, since it is structurally hard to directly interlock the ring-shaped dial knob and the gear lever, a plurality of gears (two planetary gears) are used as an interlocking mechanism interlocking the dial knob and the gear lever. Accordingly, there is a problem that an assembling man hour is increased as well as a number of the parts is increased, and a manufacturing cost becomes high.

SUMMARY OF THE INVENTION

The present invention is made by taking the conventional problem into consideration, and an object of the present invention is to provide an air conditioning control operating apparatus which can be securely operated by a-reduced number of the parts.

In order to solve the above problem, in accordance with the present invention, there is provided a vehicular air conditioning control operating apparatus including: a base member having a gear lever arranged portion having a bearing portion and an approximately tubular pinion member arranged portion integrally provided in a gear lever arranged portion having a bearing portion and an outer peripheral portion of the gear lever arranged portion and including an axis extending approximately in an orthogonal direction to an axis of the bearing portion, closing an end portion in a side of the bearing portion in the pinion member arranged portion, and provided with a communication hole communicating with the gear lever arranged portion in a closed wall portion thereof; a gear lever rotatably arranged in a bearing portion of the gear lever arranged portion, having a gear portion and driving an output member based on a rotation; an approximately tubular pinion member rotatably arranged in the pinion member arranged portion and having a pinion portion engaging with the gear portion via the communication hole; a holder passing through the pinion member, having a retention portion retaining the pinion member in a state of arranging in the pinion member arranged portion in one end, and having a fixing portion for fixing to the base member in the other end; and an operation knob arranged so as to be outside fitted to the pinion member and integrally rotating the pinion member.

In accordance with the vehicular air conditioning control operating apparatus, since the pinion member is retained in a state of being pinched to the pinion member arranged portion of the base member by the holder, it is possible to simply and securely install with no play. Further, since the gear portion of the gear lever is directly engaged with the pinion portion of the pinion member fixing the operation knob thereto via the communication hole, it is not necessary to arrange a plurality of gears for rotationally driving the gear lever. Accordingly, it is possible to achieve a reduction of a parts number and an assembling man hour, and it is possible to manufacture at a low cost.

In this vehicular air conditioning control operating apparatus, it is preferable to fix the fixing portion of the holder to the bearing portion so as to pass through the pinion member arranged portion of the base member. In accordance with this structure, it is possible to easily carry out the fixing work of the holder. Specifically, in the case of the structure in which the holder is fixed to the pinion member arranged portion in the base member, the bearing portion of the gear lever obstructs a screwing work, however, in the present invention, since the fixing portion of the holder is fixed to the bearing portion for the gear lever, the problem mentioned above is not generated, and it is possible to easily carry out the fixing work.

Further, it is preferable that the retention portion is approximately formed as a conical tubular shape, a light emitting device for lighting is arranged in an inner portion thereof, and a display panel having a predetermined display portion having a translucency is arranged at an operating position which is previously set in an open end. In accordance with this structure, it is possible to easily construct a pinion member retention portion doubling as a bulb box, without generating any light leak of the light emitting device. Further, since the retention portion doubling as the bulb box is formed as the conical tubular shape, the retention portion can serve as a reflecting plate by its incline. As a result, it is possible to more brightly illuminate the forward display panel, and it is possible to make an electric power consumption of the light source small.

Further, it is preferable that a click surface having a plurality of groove portions is provided in an inner surface of the pinion member, and a click member energized outward by an energizing device is arranged in an outer surface of the holder opposing to the click surface. In accordance with this structure, it is possible to easily construct a click mechanism applying an operation moderation. Further, in the case that the retention portion is formed as the conical tubular shape, the click mechanism can be provided in a gap formed with respect to the pinion portion. Accordingly, it is possible to downsize the air conditioning control operating apparatus.

In the vehicular air conditioning control operating apparatus in accordance with the present invention, since the gear portion of the gear lever and the pinion portion of the pinion member are structured such as to be directly engaged with each other via the communication hole, it is not necessary to arrange a plurality of gears for rotationally driving the gear lever. Accordingly, it is possible to achieve a reduction of a parts number and an assembling man hour, and it is possible to manufacture at a low cost.

BRIEF DESCRIPTION OF THE DRAWINGS

FIGS. 4A and 4B show the vehicular air conditioning control operating apparatus, in which FIG. 4A is a bottom elevational view, and FIG. 4B is a cross sectional view in a state of viewing a pinion member arranged portion from a back portion.

DETAILED DESCRIPTION OF THE PREFERRED EMBODIMENTS

A description will be given below of an embodiment in accordance with the present invention with reference to the accompanying drawings.

Figure 1:
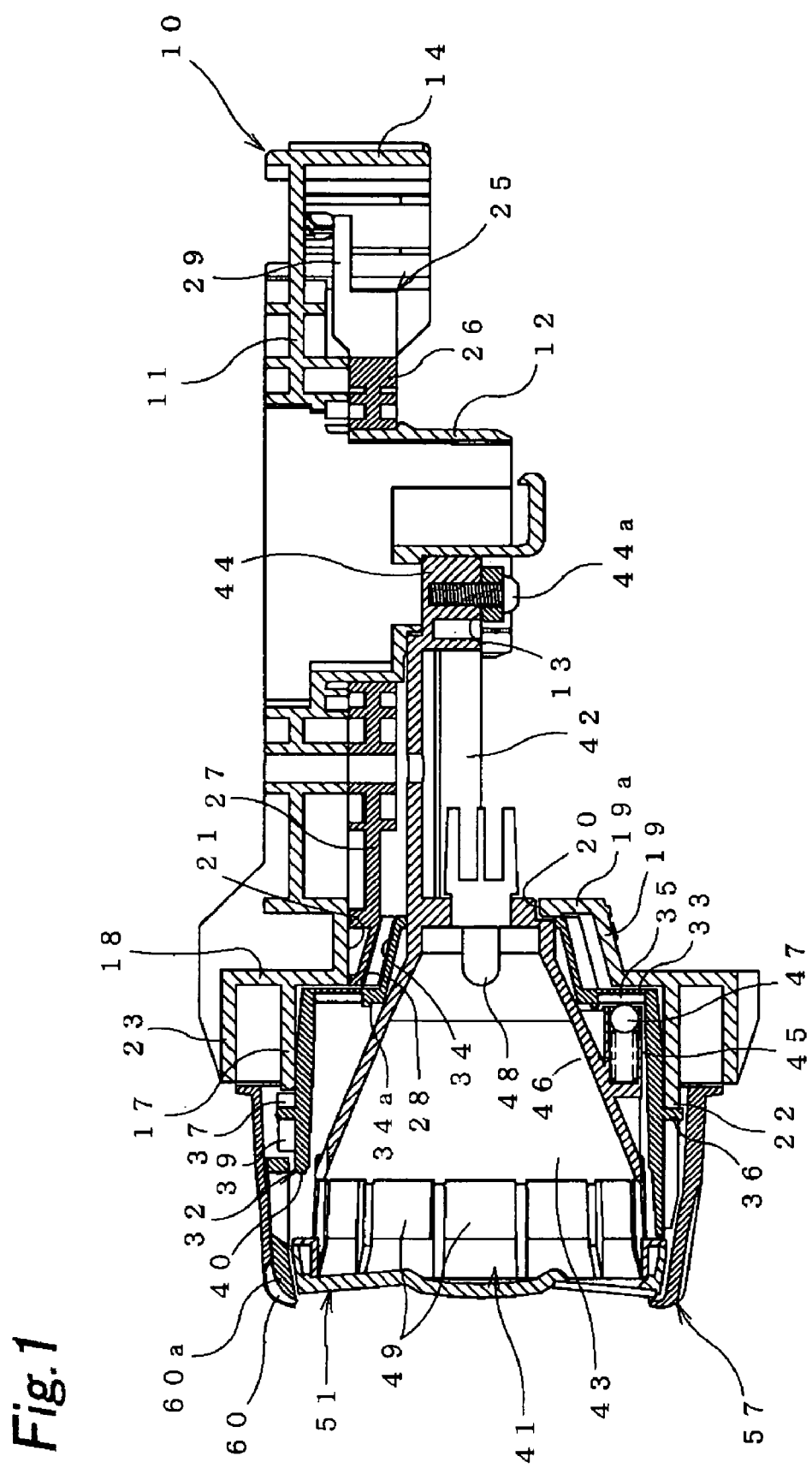
FIG. 1 is a cross sectional view showing a vehicular air conditioning control operating apparatus in accordance with an embodiment of the present invention.
Figure 2:
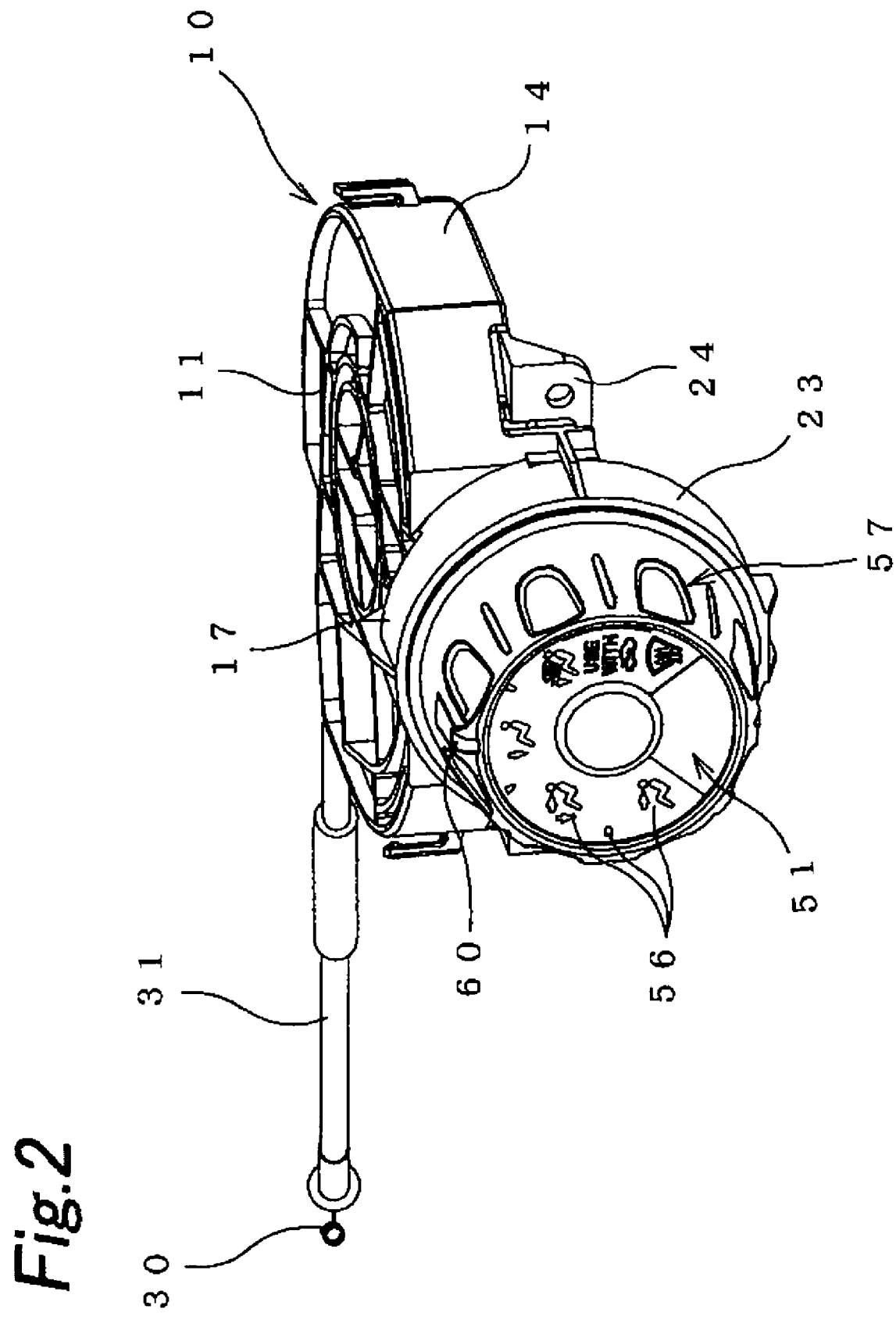
FIG. 2 is a perspective view of the vehicular air conditioning control operating apparatus.
Figure 3:
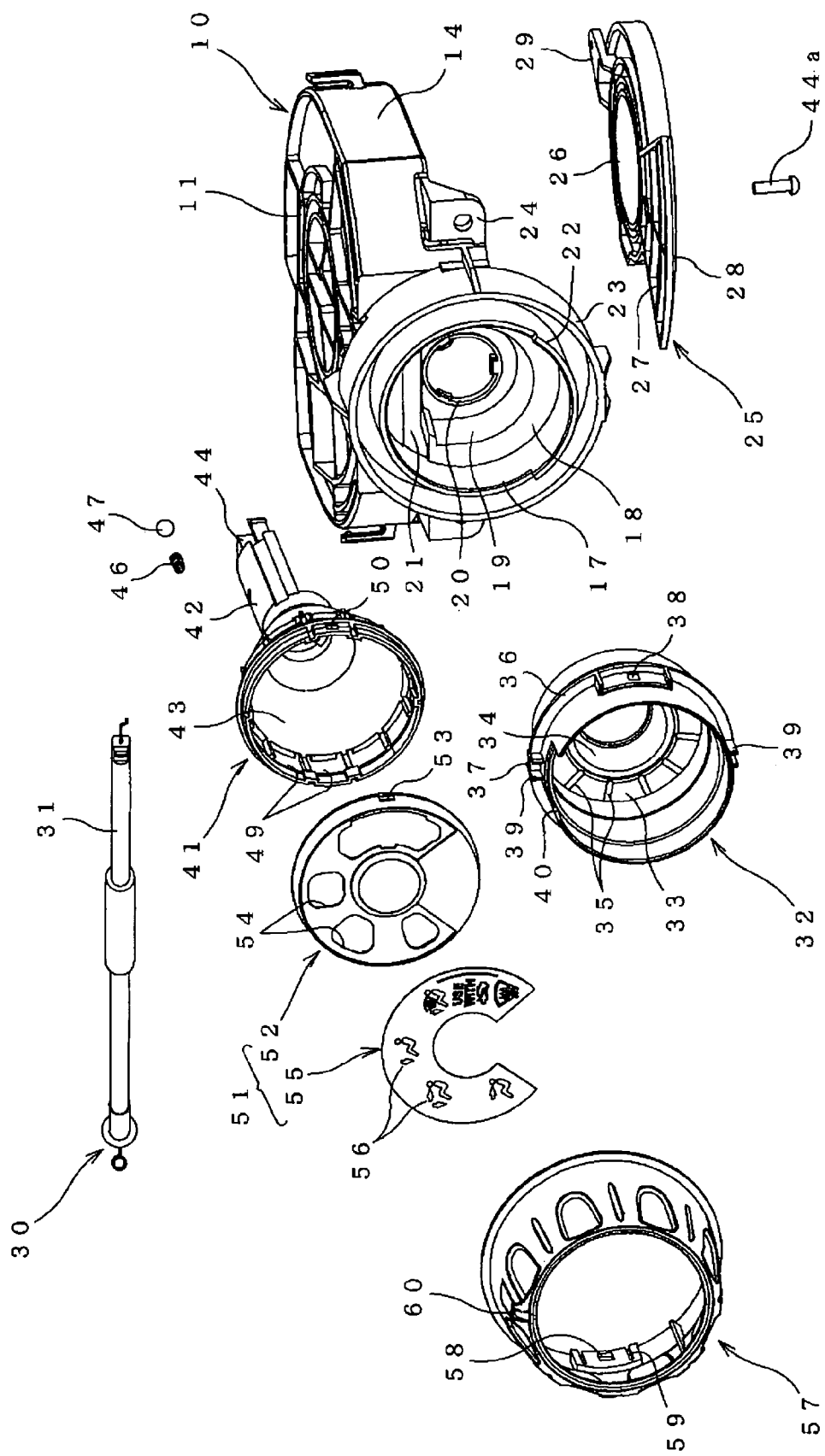
FIG. 3 is an exploded perspective view of the vehicular air conditioning control operating apparatus.

FIGS. 1 to 4 show a vehicular air conditioning control operating apparatus in accordance with an embodiment of the present invention. The vehicular air conditioning control operating apparatus is provided for selecting (changing) an operating condition of an air conditioning apparatus mounted to a vehicle. The apparatus is provided approximately with a base member 10, a gear lever 25, a pinion member 32, a holder 41, a display panel 51 and an operation knob 57, as shown in FIGS. 1 and 3.

The base member 10 is fixed within an instrument panel arranged around a handle in a driver seat of a vehicle. The base member 10 is approximately structured by integrally forming a gear lever arranged portion 11 and a pinion member arranged portion 17, as shown in FIGS. 3 and 4A.

The gear lever arranged portion 11 is formed approximately as a disc shape and rotatably installs the gear lever 25. A bearing portion 12 is provided in a protruding manner in the center of the gear lever arranged portion 11. A fixing and receiving portion 13 for fixing an end portion of a holder 41 is provided at a position opposing in a diametrical direction to a pinion member arranged portion 17 mentioned below, in an outer peripheral portion of the bearing portion 12. Further, a downward protruding outer wall portion 14 is provided in an outer peripheral edge of the gear lever arranged portion 11. An outer wall non-forming portion which does not form the outer wall portion 14 is provided in a part of the outer wall portion 14. A wire arranged portion 15 for fixing a control wire 30 mentioned below is provided in the outer wall non-forming portion.

The pinion member arranged portion 17 is formed approximately as a cylindrical shape and rotatably installs the pinion member 32. The pinion member arranged portion 17 is integrally provided in an outer peripheral portion of the gear lever arranged portion 11 in such a manner that an axis thereof extends in an orthogonal (a diametrical) direction with respect to an axis of the bearing portion 12. The pinion member arranged portion 17 is structured such that an end portion positioned in a side of the gear lever arranged portion 11 is closed. A closed end wall portion 18 regulates a movement of the pinion member 32 in a direction heading for the gear lever arranged portion 11. In other words, the pinion member arranged portion 17 is provided with the approximately disc-shaped closed wall portion 18 extending in a tangential direction with respect to the approximately disc-shaped gear lever arranged portion 11, and is provided with a cylindrical outer wall portion in the closed wall portion 18 in such a manner as to protrude outward. An axis of the closed wall portion 18 is provided with a conical tubular depressed concave portion 19 toward a side of the bearing portion 12. The center concave portion 19 is provided with a through hole 20 (refer to FIG. 4B) passing through the holder 41. Further, an upper portion of the through hole 20 in the closed wall portion 18 is provided with a communication hole 21 which extends in parallel to an extending direction of the gear lever arranged portion 11, and is communicated with the gear lever arranged portion 11, in FIG. 4B. The communication hole 21 is positioned in an outer peripheral portion of a rotating locus of the gear lever 25. The communication hole 21 is penetrated in such a manner that a part thereof includes the concave portion 19 expanding into the gear lever arranged portion 11.

In the present embodiment, a leading end edge of the cylindrically formed pinion member arranged portion 17 is provided with a regulating rib 22 protruding so as to form a circular arc shape and regulating a rotating range of the pinion member 32. Further, the pinion member arranged portion 17 is structured such that the closed wall portion 18 is formed so as to have a larger diameter than the operation knob 57, and is provided further with an outer tube portion 23 in an outer peripheral edge thereof. Further, a bracket portion 24 for fixing to the instrument panel is provided in the outer wall portion 14 of the gear lever arranged portion 11.

The gear lever 25 is arranged rotatably in the gear lever arranged portion 11 of the base member 10. The gear lever 25 is provided with an annularly formed attaching portion 26 having an inner diameter which is somewhat larger than the bearing portion 12, and a protruding portion 27 protruding from an outer peripheral edge of the attaching portion 26 so as to form a fan shape. Further, the protruding portion 27 is formed at such a dimension that a leading end goes into the communication hole 21. A gear portion 28 having a plurality of gear grooves extending in a diametrical direction is provided in the leading end. Further, the gear lever 25 is provided with a wire connection portion 29 connecting an end portion of a control wire 30 serving as an output member at a position opposing to the protruding portion 27 in a diametrical direction. The control wire 30 is structured such that an outer peripheral portion is covered by a covering material 31 constituted by a soft pipe, and the control wire 30 is driven so as to move forward and backward within the covering material 31 based on the rotation of the gear lever 25.

The pinion member 32 is formed as a cylindrical shape and is arranged rotatably in the pinion member arranged portion 17 of the base member 10, as shown in FIGS. 1 and 3. The pinion member 32 is closed in a leading end side arranged in the pinion member arranged portion 17. The pinion member 32 is provided with a pinion portion 34 protruding so as to form a conical tubular shape and forming a gear groove in an outer peripheral surface, in the center of the closed portion 33. The pinion portion 34 is engaged with the gear portion 28 of the gear lever 25 by being installed within the concave portion 19 of the pinion member arranged portion 17, and rotates the gear lever 25 working with the pinion member 32. Further, a plurality of click groove portions 35 extending in a diametrical direction are provided at a predetermined position in an inner surface of the closed portion 33, and construct a click surface of a click mechanism. Further, an outer peripheral surface of the pinion member 32 is provided in a protruding manner with a flange portion 36 having a larger diameter than the pinion member arranged portion 17. Further, the flange portion 36 is provided with a slidable contact rib 37 protruding in the same direction as the pinion portion 34. The slidable contact rib 37 is brought into contact with the regulation rib 22 of the pinion member arranged portion 17, whereby the rotating range of the pinion member 32 is regulated in a predetermined range. Further, an outer peripheral surface of the pinion member 32 is provided with a locking portion 38 for fixing the operation knob 57, and is provided with a plurality of positioning ribs 39. Further, an open end of the pinion member 32 is provided with a translucent notch portion 40 corresponding to an operation instructing portion 60.

The holder 41 passes through an inner portion of the pinion member 32, and is structured such that the pinion member 32 is arranged so as not to break away from the base member 10 in a rotatable state. The holder 41 is provided with a hemicylindrical shaft portion 42. The shaft portion 42 is provided with a retention portion 43 in one end, and is provided with a fixing portion 44 in the other end. The retention portion 43 is arranged in an inner portion of the pinion member 32, rotatably retains the pinion member 32 from an inner portion, retains the pinion member 32 in such a manner that the pinion member 32 does not break away from the pinion member arranged portion 17 by a contact with the closed portion 33, and is formed as a conical tubular shape. The fixing portion 44 is structured such as to pass through the pinion member 32 and the pinion member arranged portion 17, and be inserted to the fixing and receiving portion 13 of the base member 10 so as to be fixed by a screw 44a. In the present embodiment, a tube portion 45 protruding in an orthogonal direction toward the closed portion 33 is provided in an outer peripheral surface of the retention portion 43. A spring 46 corresponding to an energizing device is arranged in an inner portion of the tube portion 45. A click member 47 constituted by a spherical body energized toward the closed surface by the spring 46 is arranged. Further, the retention portion 43 is opened in such a manner that a connected end to the shaft portion 42 is communicated with an internal space of the shaft portion 42. A bulb 48 corresponding to a light emitting device for lighting is arranged in an inner portion from the opening. Further, a plurality of translucent holes 49 are provided in an outer peripheral portion positioned near the open end of the retention portion so as to be spaced at a predetermined interval in a circumferential direction. Further, the open end of the retention portion 43 is provided with a panel locking portion 50 for installing the display panel 51.

The display panel 51 is structured such as to show an operating (rotating) position of the rotatable pinion member 32 around the retention portion 43 by being arranged in an open end of the retention portion 43. The display panel 51 is constituted by a catch pan shaped cover member 52, and a sheet member stuck to a surface of the cover member 52. The cover member 52 is provided with a locked portion 53 locking to a panel locking portion 50 in an outer peripheral surface. Further, a punching portion 54 is provided in a portion corresponding to the operating position, in the disc-shaped surface of the cover member 52. The seat member 55 is constituted by a transparent resin sheet approximately formed as a C-shaped form, and a back surface thereof, that is, an opposing surface stuck to the cover member 52 is provided with a first print layer having a light blocking coloration (a black color) which does not transmit the light, except the display portion 56 at each of previously set operating positions. Further, a second print layer having a translucent coloration (a white color) is provided in a portion corresponding to the display portion 56, in a surface of the first print layer. Further, an adhesion layer for being adhered to the cover member 52 is provided in the surfaces of the first and second print layers. Accordingly, the light of the bulb 48 emitting light within the holder 41 transmits only on the display portion 56 of the display panel 51, and a design and a character of the display portion 56 are displayed so as to stand out. In this case, since the present embodiment is structured such as to select an air supply opening to the vehicle room by the vehicular air conditioning control operating apparatus, the display portion 56 is designed such as to correspond to the air supply position. Accordingly, in the case of using the vehicular air conditioning control operating apparatus in accordance with the present embodiment so as to select the temperature setting, the display portion 56 is structured as a level display constituted by a numerical character indicating a designated temperature and a coloration of a red color and a blue color.

The operation knob 57 is formed as a tubular shape so as to be outside fitted and attached to the open end of the pinion member 32 and integrally rotate the pinion member 32. The operation knob 57 is provided with a locked portion 58 corresponding to the locking portion 38 in an inner peripheral surface, and is provided with a positioning groove 59 corresponding to the positioning rib 39. Further, a part of the outer peripheral surface is provided with an operation instructing portion 60 evaginating outward and indicating the operating (selecting) position. The operation instructing portion 60 is provided with a translucent lens 60a, and is structured such as to be lighted by the light of the bulb 48 transmitting through the translucent notch portion 40.

In order to assemble the vehicular air conditioning control operating apparatus structured as mentioned above, for example, after the gear lever 25 is rotatably arranged with respect to the base member 10, the control wire 30 is connected to the gear lever 25. Thereafter, the holder 41 is passed through the pinion member 32 from the side of the fixing portion 44, in a state in which the spring 46 and the click member 47 are arranged with respect to the holder 41. In this state, the fixing portion 44 is fixed to the fixing and receiving portion 13 by a screw 44a by arranging in the pinion member arranged portion 17 from the side of the fixing portion 44 of the holder 41 and passing through the through hole 20. At this time, the gear lever 25 and the pinion member 32 are brought into line with the predetermined operating positions, and the gear portion 28 and the pinion portion 34 are engaged in the portion of the communication hole 21. Further, the display panel 51 is arranged with respect to the holder 41, and the operation knob 57 is arranged with respect to the pinion member 32 so as to be fixed.

Further, in the vehicular air conditioning control operating apparatus assembled as mentioned above, the end surface in the side of the gear lever arranged portion 11 of the pinion portion 34 of the pinion member 32 is brought into contact with the bottom surface 19a of the concave portion 19 of the pinion member arranged portion 17, whereby the movement of the pinion member 32 in the direction heading for the gear lever arranged portion 11 is regulated. Further, an edge portion 34a in a forward side (a left side in FIG. 1) of the pinion portion 34 is brought into contact with the outer peripheral surface of the retention portion 43 of the holder 41, whereby the movement in the direction heading for the forward side is regulated. As mentioned above, the pinion member 32 is retained in a state in which the pinion member 32 is pinched by the holder 41 with respect to the pinion member arranged portion 17 of the base member 10.

If the occupant rotationally operates the operation knob 57 of the vehicular air conditioning control operating apparatus, the pinion member 32 integrally rotates in an interlocking manner around the retention portion 43 of the holder 41 and in the inner portion of the pinion member arranged portion 17 of the base member 10. Accordingly, the gear portion 28 engaging with the pinion portion 34 is rotated around the bearing portion 12, whereby the gear lever 25 is rotated. As a result, the control wire 30 is driven in the forward moving direction or the backward moving direction in accordance with the rotation.

In this case, since the pinion portion 34 engaging with the gear portion 28 of the gear lever 25 is provided in the outer peripheral surface of the pinion member 32 formed as the cylindrical shape, the pinion portion 34 is an easily deforming structure. However, since the pinion member 32 is retained rotatably while being pinched by the retention portion 43 of the holder 41 and the pinion member arranged portion 17 of the base member 10, the deformation of the pinion portion 34 is prevented, and a malfunction or the like is not caused.

As mentioned above, in the vehicular air conditioning control operating apparatus in accordance with the present embodiment, since the pinion member 32 is retained with respect to the pinion member arranged portion 17 of the base member 10 in the state of being pinched by the holder 41, it is possible to simply and securely install without any play. Further, since the gear lever 25 is directly engaged with the pinion portion 34 of the pinion member 32 to which the gear portion 28 fixes the operation knob 57 via the communication hole 21, it is not necessary to arrange a plurality of gears for rotationally driving the gear lever 25. Accordingly, it is possible to reduce a parts number and an assembling man hour, and it is possible to manufacture at a low cost.

Further, since the fixing portion 44 of the holder 41 is fixed to the bearing portion 12 while passing the pinion member arranged portion 17 of the base member 10 therethrough, it is possible to easily carry out the fixing work of the holder 41. Specifically, in the case that the holder 41 is structured such as to be fixed to the closed wall portion 18 of the pinion member arranged portion 17 in the base member 10, the bearing portion 12 of the gear lever 25 obstructs the screwing work, however, in the present invention, since the fixing portion 44 of the holder 41 is fixed to the bearing portion 12 for the gear lever, the problem mentioned above is not generated, and it is possible to easily carry out the fixing work.

Further, the present embodiment is structured such that the bulb 48 for lighting is arranged within the retention portion 43 of the holder 41, and the display portion 56 of the open end is displayed. Accordingly, it is possible to simply construct the retention portion 43 of the pinion member 32 doubling as the bulb box without generating any light leak of the bulb 48. Further, since the retention portion 43 is formed as the conical tubular shape, it is possible to serve as a reflecting plate by its incline. As a result, it is possible to more brightly illuminate the forward display panel 51, and it is possible to make the electric power consumption of the light source small.

Further, since a plurality of click groove portions 35 are provided in the inner surface of the pinion member 32, and the click member 47 energized by the spring 46 is arranged in the outer surface of the holder 41, it is possible to easily construct the click mechanism applying the operation moderation. Further, in the present embodiment, since the retention portion 43 is formed as the conical tubular shape, a comparatively large gap can be formed between the pinion member 32 and the holder 41, and the click mechanism can be sufficiently provided in the gap. Accordingly, it is possible to downsize the air conditioning control operating apparatus.

In this case, the vehicular air conditioning control operating apparatus in accordance with the present invention is not limited to the structure of the embodiment, but can be variously modified.

For example, in the embodiment mentioned above, the operation knob 57 and the pinion member 32 are structured as the independent bodies, however, may be integrally structured. Further, the gear portion 28 of the gear lever 25 and the pinion portion 34 of the pinion member 32 are engaged within the communication hole 21, however, are not limited to this structure, but may be, for example, formed in the concave portion 19 of the pinion member arranged portion 17 separately, whereby the gear portion 28 and the pinion portion 34 are engaged with each other in the back surface side of the closed wall portion 18. In this case, the open hole of the divided concave portion 19 may be formed as the communication hole 21, and the movement regulation of the pinion member 32 to the backward side may be achieved by bringing the back surface side of the closed portion 33 of the pinion member 32 into contact with the closed wall portion 18 of the pinion member arranged portion 17 so as to retain.

What is claimed is:

1. A vehicular air conditioning control operating apparatus comprising:
   a base member having a gear lever arranged portion having a bearing portion and an approximately tubular pinion member arranged portion integrally provided in an outer peripheral portion of the gear lever arranged portion and including an axis extending approximately in an orthogonal direction to an axis of the bearing portion, closing an end portion in a side of the bearing portion in the pinion member arranged portion, and provided with a communication hole communicating with the gear lever arranged portion in a closed wall portion thereof;
   a gear lever rotatably arranged in a bearing portion of the gear lever arranged portion, having a gear portion and driving an output member based on a rotation;
   an approximately tubular pinion member rotatably arranged in the pinion member arranged portion and having a pinion portion engaging with the gear portion via the communication hole;
   a holder passing through the pinion member, having a retention portion retaining the pinion member in a state of arranging in the pinion member arranged portion in one end, and having a fixing portion for fixing to the base member in the other end; and
   an operation knob arranged so as to be outside fitted to the pinion member and integrally rotating the pinion member.

2. The vehicular air conditioning control operating apparatus as claimed in claim 1, wherein the fixing portion of the holder is fixed to the bearing portion so as to pass through the pinion member arranged portion of the base member.

3. The vehicular air conditioning control operating apparatus as claimed in claim 2, wherein the retention portion is approximately formed as a conical tubular shape, a light emitting device for lighting is arranged in an inner portion thereof, and a display panel having a predetermined display portion having a translucency is arranged at an operating position which is previously set in an open end.

4. The vehicular air conditioning control operating apparatus as claimed in claim 2, wherein a click surface having a plurality of groove portions is provided in an inner surface of the pinion member, and a click member energized outward by an energizing device is arranged in an outer surface of the holder opposing to the click surface.

5. The vehicular air conditioning control operating apparatus as claimed in claim 1, wherein the retention portion is approximately formed as a conical tubular shape, a light emitting device for lighting is arranged in an inner portion thereof, and a display panel having a predetermined display portion having a translucency is arranged at an operating position which is previously set in an open end.

6. The vehicular air conditioning control operating apparatus as claimed in claim 5, wherein a click surface having a plurality of groove portions is provided in an inner surface of the pinion member, and a click member energized outward by an energizing device is arranged in an outer surface of the holder opposing to the click surface.

7. The vehicular air conditioning control operating apparatus as claimed in claim 1, wherein a click surface having a plurality of groove portions is provided in an inner surface of the pinion member, and a click member energized outward by an energizing device is arranged in an outer surface of the holder opposing to the click surface.

* * * * *